US005796938A

United States Patent [19]

Emberty et al.

[11] Patent Number: 5,796,938

[45] Date of Patent: Aug. 18, 1998

[54] DIAGNOSTIC SUBSYSTEM AND METHOD FOR SCSI INTERFACE

[75] Inventors: Robert George Emberty; Craig Anthony Klein; Felix Joseph Misewich, all of Tucson, Ariz.

[73] Assignee: International Business Machines Corporation, Armonk, N.Y.

[21] Appl. No.: 763,792

[22] Filed: Dec. 11, 1996

[51] Int. Cl.$^6$ ................................................. G06F 11/26
[52] U.S. Cl. ............................................... 395/183.03
[58] Field of Search .................... 395/183.19, 183.06, 395/183.08, 183.17, 183.15, 185.09, 183.03

[56] References Cited

U.S. PATENT DOCUMENTS

| | | | |
|---|---|---|---|
| 3,922,537 | 11/1975 | Jackson | 395/183.08 |
| 4,907,230 | 3/1990 | Heller et al. | 395/183.08 |
| 5,033,049 | 7/1991 | Keener et al. | 371/23 |
| 5,129,072 | 7/1992 | Larner et al. | 395/425 |
| 5,257,393 | 10/1993 | Miller | 395/800 |
| 5,333,277 | 7/1994 | Searls | 395/325 |
| 5,471,634 | 11/1995 | Giorgio et al. | 395/600 |
| 5,475,814 | 12/1995 | Tomimitsu | 395/183.06 |
| 5,499,378 | 3/1996 | McNeill, Jr. et al. | 395/500 |
| 5,581,565 | 12/1996 | Meyer | 395/183.06 |
| 5,586,271 | 12/1996 | Parrett | 395/283 |
| 5,615,335 | 3/1997 | Onffroy et al. | 395/183.06 |
| 5,652,839 | 7/1997 | Girogio et al. | 395/200.11 |
| 5,699,533 | 12/1997 | Sakai | 395/311 |

*Primary Examiner*—Robert W. Beausoliel, Jr.
*Assistant Examiner*—Scott T. Baderman
*Attorney, Agent, or Firm*—John H. Holcombe; R. M. Sullivan

[57] ABSTRACT

Diagnostic apparatus and method are disclosed for testing a Small Computer System Interface (SCSI), by passively monitoring the interface between initiator and target devices or systems, upon sensing a user-selected phase of operation at the interface, disconnecting the initiator and target devices from one another, forcing a user-selected fault for the appropriate time, and reverting to a passive monitor. A pair of analog switches are provided for each line of the interface. The switches selectively connect the initiator system and the target system to each other or to a set of line drivers for providing high or low SCSI signals. A set of sense lines are connected to the initiator and the target for monitoring so as to sense the phase of operation of the initiator and target and to sense the response of the interface to the forced fault.

12 Claims, 3 Drawing Sheets

DIAGNOSTIC SUBSYSTEM AND METHOD FOR SCSI INTERFACE

TECHNICAL FIELD

This invention relates to a Small Computer System Interface (SCSI) and, more particularly, the invention relates to a diagnostic subsystem and method for testing a target system at the Interface.

BACKGROUND OF THE INVENTION

The Small Computer System Interface (SCSI) comprises a generic interface architecture with a standard signaling protocol. The interface operates as a low cost network for supporting devices such as hard disk drives, diskette drives, optical disk drives, CD ROM drives, tape drives, printers, etc., and connecting the devices to a host computer or network.

Demands on such host computers and networks has required that data integrity and availability be of utmost importance. As the result, data storage devices, such as those mentioned above, have become far more reliable and fault tolerant, and data storage subsystems have been developed that are available continuously without interruption, such as RAID. In order to enhance the capabilities of such data storage devices without using host resources, many data storage devices have the capability of communicating directly with each other, called "peer-to-peer" operations, for example, to directly back up a hard drive to tape, without transmitting the data through the host. The interfaces linking the various components of a subsystem are now typically its most failure prone aspect.

The SCSI is an important example of the open systems environment which is replacing the proprietary systems environment, in which an interface is specifically designed to provide efficient and reliable communication between a specific host and a specific device or device family, usually of a single manufacturer. In the open systems environment represented by the SCSI standard, the resultant interface is a compromise among many different requirements and is even more failure prone.

In the past, SCSI fault testing was accomplished by replacing either the initiator or target with an emulator, which not only created the desired fault, but also acted as one end of the initiator-target pair. The initiator or the target could thus be tested, but not the system as a whole.

One approach to testing a network controller for a SCSI subsystem is illustrated in U.S. Pat. No. 5,033,049, assigned to the same assignee as the present invention. It provides "on-board" diagnostic hardware intended for manufacturing test and power on self test. It will not function in an operating subsystem environment as the hardware is contained in the initiator.

Another approach is represented by U.S. Pat. No. 5,257,393, J. R. Miller, assigned to JRM Consultants, Inc. It refers to a network of SCSI devices linked together via a serial interface with error simulation capability through use of a diagnostic latch with open cable drivers. The test device replaces the initiator for the purpose of testing the target device.

With the advent of RAID subsystems and peer-to-peer operations, it is not practical to simulate component malfunctions with an emulator replacing an initiator or target as part of the subsystem.

What is needed is the ability to provide SCSI fault simulation within a complete system or subsystem.

SUMMARY OF THE INVENTION

Disclosed are diagnostic apparatus and method for passively monitoring the SCSI interface, upon sensing a user-selected phase of operation at the interface, disconnecting the initiator and target devices from one another, forcing a user-selected fault for the appropriate time, and reverting to a passive monitor. A pair of analog switches are provided for each line of the interface. The switches selectively connect the initiator system and the target system to each other or to a set of line drivers for providing high or low SCSI signals. A set of sense lines are connected to the initiator and the target for monitoring so as to sense the phase of operation of the initiator and target and to sense the response of the interface to the forced fault.

Other than conducting fault simulation, the diagnostic apparatus and method do not alter the behavior of the subsystem.

For a fuller understanding of the present invention, reference should be made to the following detailed description taken in conjunction with the accompanying drawings.

DETAILED DESCRIPTION OF THE INVENTION

Figure 1:
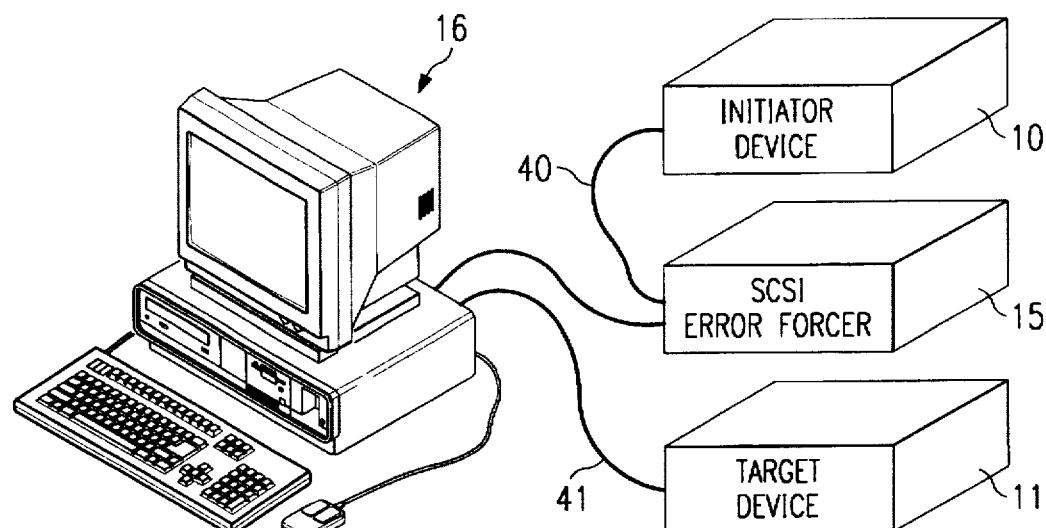
FIG. 1 is a diagrammatic representation of a SCSI network system and of the diagnostic subsystem of the present invention.
Figure 2:
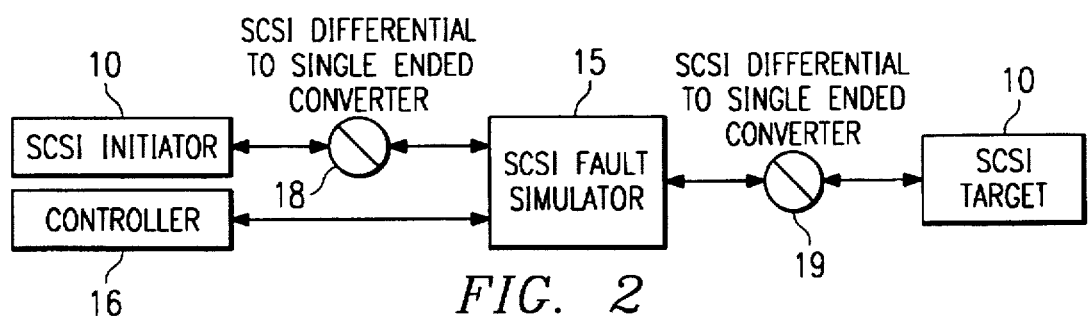
FIG. 2 is a block diagram of the network and subsystem of FIG. 1.

Referring to FIGS. 1 and 2, a Small Computer System Interface (SCSI) is shown, connecting at least an initiator device or subsystem 10 and a target device or subsystem 11. A SCSI interface comprises a generic interface architecture with a standard signaling protocol. The interface operates as a low cost network for supporting devices such as hard disk drives, diskette drives, optical disk drives, CD ROM drives, tape drives, printers, etc., and connecting the devices to a host computer or network. In FIGS. 1 and 2, the initiator 10 and the target 11 may each comprise any of the listed devices or hosts, or any other suitable device or subsystem connectable over a SCSI interface.

As discussed above, data integrity and availability have become of utmost importance. As the result, devices and subsystems attached by means of SCSI interfaces, particularly data storage devices and data storage subsystems, are required to be available continuously without interruption. In addition, many data storage devices have the capability of communicating directly with each other, called "peer-to-peer" operations, for example, to directly back up a hard drive to tape, without transmitting the data through the host. The interfaces linking the various components of a subsystem are now typically its most failure prone aspect.

The SCSI interface is an important example of the open systems environment which is replacing the proprietary systems environment, but the resultant interface is a compromise among many different requirements and is even more failure prone.

In the past, SCSI fault testing was accomplished by replacing either the initiator or target with an emulator, which not only created the desired fault, but also acted as one end of the initiator-target pair. The initiator or the target could thus be tested, but not the system as a whole.

Still referring to FIGS. 1 and 2, a SCSI error forcer or fault simulator 15 and controller 16 are shown which have the ability to provide SCSI fault simulation within a complete system or subsystem. The controller 16 may comprise a suitably programmed small computer, such as a PC, where a user may enter desired testing parameters, as will be explained.

Referring to FIG. 2, one preferred embodiment of the invention employs single ended connections. The SCSI interface employs differential connections, requiring SCSI differential to single ended converters 18 and 19 for interconnection therebetween.

Figure 3:
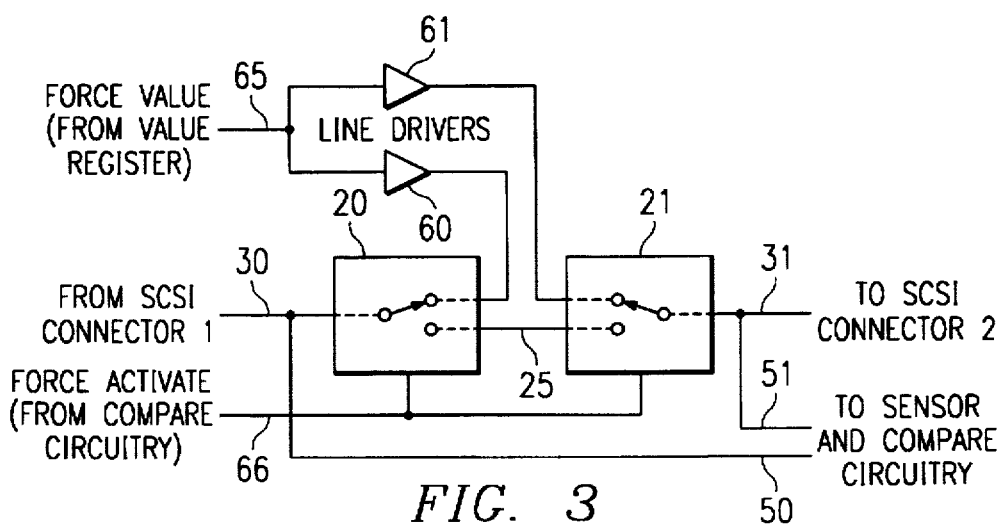
FIG. 3 is a block diagram of one set of switches and line drivers of the diagnostic subsystem of FIGS. 1 and 2.

FIG. 3 is a block diagram of the circuitry for forcing one bit of the diagnostic subsystem of FIGS. 1 and 2 onto the SCSI interface. For example, the circuitry of FIG. 3 may be repeated 26 times to provide the 27 bit capability of a SCSI-II interface.

The circuitry for each bit includes analog switches 20 and 21, connected to each other by line 25. Analog switch 20 is connected to one SCSI connector by line 30, and analog switch 21 is connected to the other SCSI connector by line 31. The SCSI connectors are not shown and are standard connectors for connection to cables 40 and 41, respectively, in FIG. 1. Alternatively, lines 30 and 31, may be connected to, respectively, SCSI differential to single ended converters 18 and 19, in FIG. 2.

Analog switches 20 and 21 normally connect line 30 to line 31 through line 25, allowing the initiator 10 and target 11 to operate normally over the SCSI interface. Lines 50 and 51 connect the respective lines 30 and 31 from the initiator and the target to sensors or comparing circuitry. The sensors or comparing circuitry are not shown, and are typical as used in the art. An exemplary device incorporating such circuitry will be described with respect to FIG. 6, hereinafter.

Still referring to FIG. 3, switches 20 and 21 are also connected to line drivers 60 and 61, respectively. Line drivers 60 and 61 are conventional and may be those used in SCSI interfaces for supplying high or low SCSI signals, or may be of a type suitable for supplying a full range of signal levels. The line drivers are both connected to line 65, which supplies the appropriate signal to cause both line drivers to supply the described high or low SCSI signal, or other signal levels.

Analog switches are operated by activation signals on line 66 to switch from the normal connection at line 25 to connect instead to line drivers 60 and 61, respectively. When so switched, the SCSI initiator and target are no longer connected to each other through line 25, but rather are connected to line drivers 60 and 61, respectively.

As an alternative, line drivers 60 and 61 may be provided with separate lines 65 for receiving appropriate signals causing the line drivers to provide the same or different high or low SCSI signals thereby.

Figure 4:
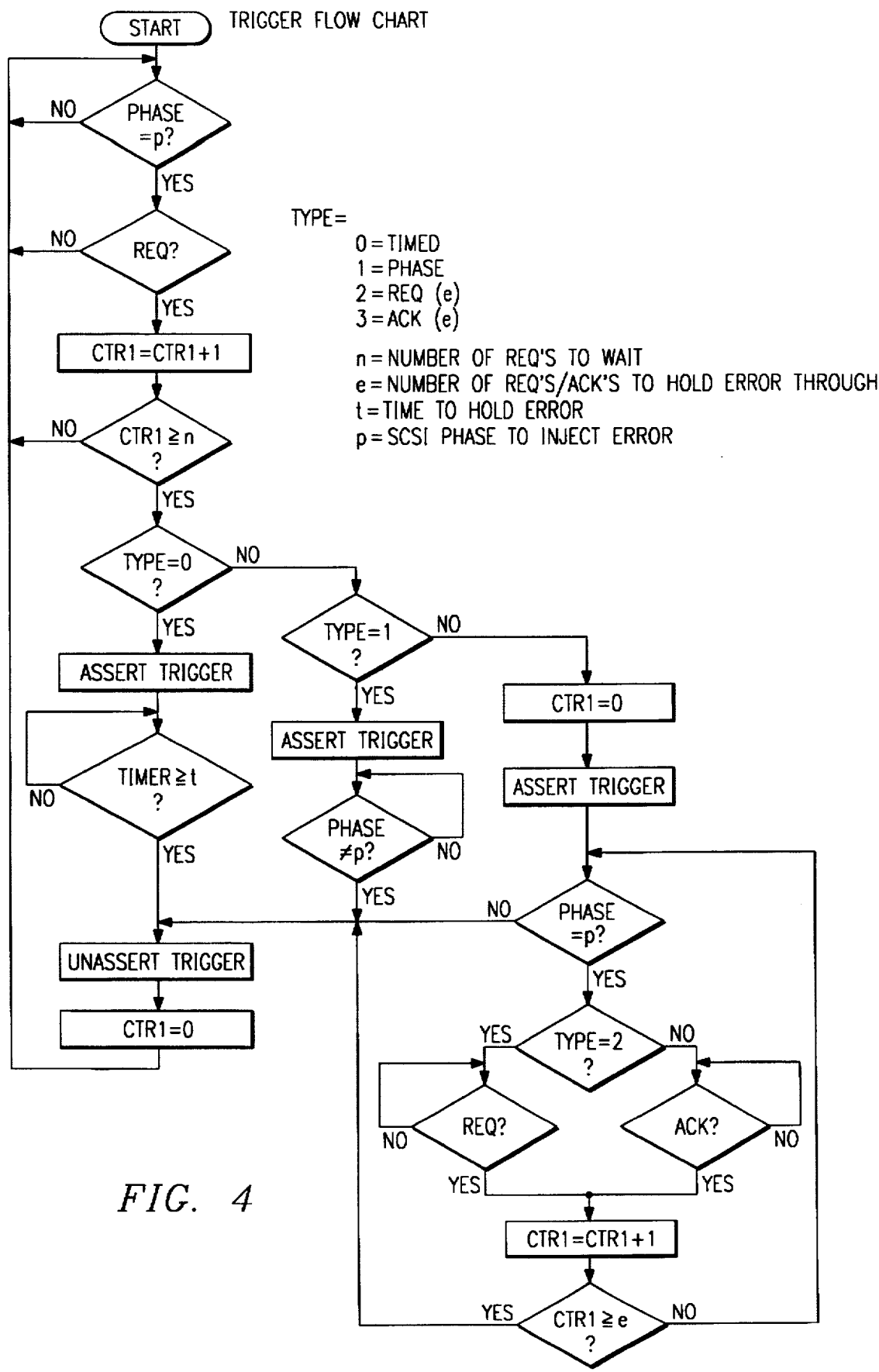
FIG. 4 is a flow chart depicting the method of the present invention.
Figure 5:
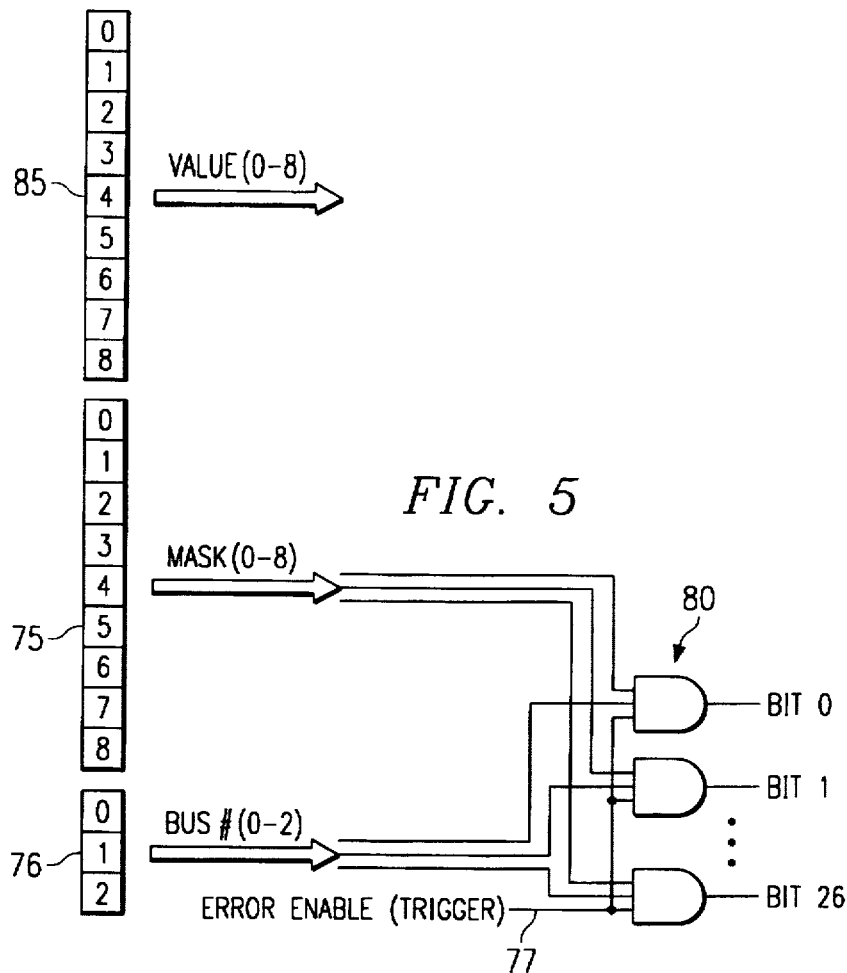
FIG. 5 is an illustration of the data flow of the diagnostic subsystem of FIGS. 1 and 2.

The operation of the subsystem of FIGS. 1 and 2, and of the circuitry of FIG. 3, are described with reference to FIGS. 4 and 5. FIG. 4 is a flow chart depicting the method of the present invention, and FIG. 5 is an illustration of the data flow of the present invention.

The first decision block in FIG. 4, "PHASE=P?", is whether the phase of operation of the SCSI interface, or the pattern of bits at the interface, match that supplied by the user at controller 16. The bits appearing on each of the lines 50 and 51 for all of the circuits representing the full 27 bits of the interface are compared to the pattern of bits designated by the user. If no match occurs, the comparison continues at the next clock cycle.

If the comparison indicates a match, the "YES" branch of the decision block leads to the next decision block. The next decision block "REQ?" is whether a "request" signal has been provided at the interface by the initiator or the target systems on the sense lines. If "NO" the comparison again continues at the next clock cycle.

The user may supply a number indicating that the "request" signal must occur a designated number of times. Thus, when the "YES" branch is taken, the next step is to increment a counter by 1 to indicate that a requested signal has been generated.

The resultant count is then compared in the next decision block "COUNTER=n?" to the designated number of requests. If the counter is less than the designated number of requests, the "NO" branch leads back to the start. If the counter is equal to or exceeds the designated number of requests, the "YES" branch is taken.

The "YES" branch from the "COUNTER =n?" indicates that an error is to be forced to simulate a fault.

Two major types of error forcing is provided. One type is a timed error, called "TYPE 0", and the other is a phase error, called "TYPE 1". The timed error is to be maintained for a predetermined time. A phase error is to be maintained until a predetermined state of operation of the interface is reached, as will be explained hereinafter.

The first decision block reached is "TYPE=0?". If the user has designated that the forced error is a timed error, the "YES" branch is taken, leading to the "Assert Trigger" step.

The "Assert Trigger" step is best explained with reference to FIG. 5. The 27 lines of the SCSI interface are designated by a conventional combination of mask and bus bits. An example is illustrated in the '049 patent.

Here, each bus comprises 9 bits as shown by the "mask bits (0–8)" register 75. The three busses are designated by the "bus # (0–2)" register 76.

The "Assert Trigger" step in FIG. 4 causes an error enable (trigger) signal to be supplied on line 77 to logical AND gates 80. Registers 75 and 76 then sequence through the three busses of the SCSI interface, providing masking signals to selected ones of the AND circuits. Upon register 76 and the error enable signal gating the AND circuits 80 for bit lines 0–8, register 75 supplies trigger signals to selected ones of the nine bit lines.

Each of the nine bit lines corresponds to the force activate line 66 in FIG. 3 for that bit of the interface.

Referring again to FIG. 5, a value register 85 is provided for each of the nine bits of the interface. Each bit of the register corresponds to an AND circuit 80 and is preset by the user to provide a "one" or "zero" signal to force value line 65 in FIG. 3. The value signal operates line drivers 60 and 61 to provide the designated "one" or "zero" signal through, respectively, switches 20 and 21 to the respective SCSI devices or systems.

The process continues for each of the other two busses. Alternatively, registers 75 and 76 and register 85 may each comprise 3 nine-bit registers, each bit corresponding to one of the force bit circuits of FIG. 3.

Referring again to FIG. 4, in the TYPE 0 (timed error) sequence, after the trigger is asserted, a timer is compared to a time "t" preselected by the user. The "NO" branch is a loop which continues until the timeout, when the timer is equal to or greater than "t". The trigger is then unasserted (turned off) and the counter is reset to 0.

The "NO" branch from the "TYPE =0" block indicates that one of three "phase" errors are to be forced.

The first type of phase error is to insert the error only so long as the interface remains in the current phase of operation with the same pattern of bits. Decision block "TYPE= 1?" detects whether the user has designated this phase error. If so, the "YES" branch is taken and the trigger asserted until the next decision block indicates the phase of operation has changed. Then, as with the timed error, the trigger is unasserted and counter reset to 0.

If the phase error is not a type 1, the error will be maintained until either a predetermined number of request signals or a predetermined number of acknowledgement signals have been received from the initiator or the target. Thus, the first steps are to set the counter to 0 and to assert the trigger.

The phase error is only to be continued if the interface remains in the same phase of operation, as determined at decision block "PHASE=P". If not, the trigger is again unasserted and the counter reset to 0. If so, the next decision is whether the designated phase error is to be terminated after a preselected number of request signals or a preselected number of acknowledgement signals. The decision block "TYPE=2" responds to the user designation, type 2 being the request signal, and type 3, or the "NO" branch, being the acknowledgement signal.

The "REQ?" and "ACK?" decision blocks loop until the respective signal is received and the counter incremented. Until last decision block indicates that the preselected number has been reached, the "NO" branch loops back to again check the phase and whether the respective signal has been received. When the counter reaches the preselected number, the trigger is unasserted and the counter reset to 0.

Figure 6:
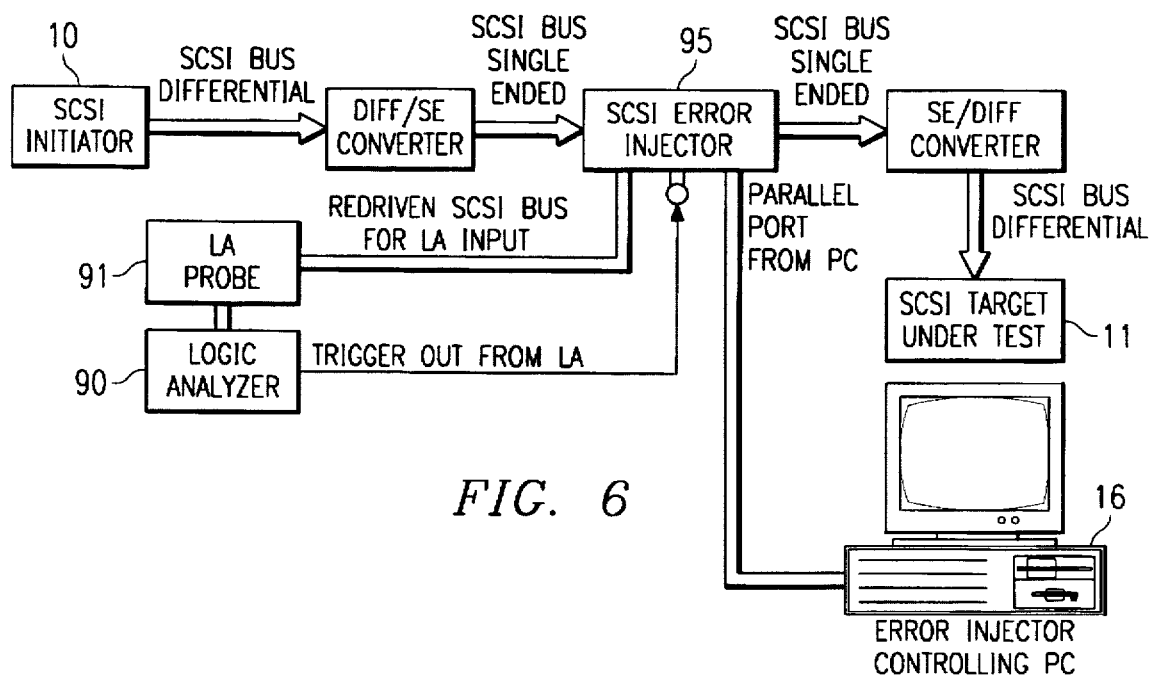
FIG. 6 is a block and diagrammatic representation of an alternative embodiment of a SCSI network system and of the diagnostic subsystem of the present invention.

An alternative preferred embodiment of the invention is illustrated in FIG. 6. A commercially available logical analyzer 90, such as the Tektronix DAS 9200, is connected to the sense lines 50 and 51 in FIG. 3 through the logical analyzer probe 91. The compare circuitry of the logic analyzer is preset in accordance with the steps of FIG. 4 to sense the pattern of bits appearing on the sense lines of the interface and provide the assert trigger signals. The commercially available logical analyzers comprise at least one microprocessor and normally provide the trigger signals at an output port to activate an external measurement module, such as an oscilloscope. On the Tektronix DAS 9200, the output port is the "Port-Out" BNC.

SCSI error injector 95 thus comprises the circuitry of FIG. 3 for connection to the SCSI initiator 10 and the target 11 under test.

While the method of the present invention has been described with respect to the SCSI interface only, the inventors contemplate that the present invention may be equally well employed with other interfaces having multiple lines and high and low signals for each line.

While the preferred embodiments of the present invention have been illustrated in detail, it should be apparent that modifications and adaptations to those embodiments may occur to one skilled in the art without departing from the scope of the present invention as set forth in the following claims.

What is claimed:

1. A diagnostic subsystem for use with a Small Computer System Interface (SCSI), said interface having a plurality of lines connecting an initiator system and a target system, said diagnostic subsystem comprising:

a set of line drivers for providing a range of signals, said set of line drivers comprising a pair of line drivers for each line of, respectively, the initiator and target systems;

a set of switches for selectively connecting said initiator system and said target system to each other or to said line drivers, said set of switches comprising a pair of switches for, respectively, the initiator and target systems;

a set of sense lines connected to said initiator system and to said target system, said set of sense lines comprising a pair of sense lines connected to each line of, respectively, the initiator and target systems; and a controller for selectively operating selected ones of said switches to disconnect said initiator and said target systems and connect selected ones of said line drivers at selected lines of said Interface, operating said selected line drivers to selectively provide selected signals within said range to said Interface, said controller selectively operating said selected ones of said switches and operating said selected line drivers upon sensing a selected phase of operation of said Interface at said sense lines, and said controller selectively operating said selected switches and said selected line drivers upon sensing said selected phase of operation and upon a generation of request signal by one of said initiator or target systems at said Interface a selected number of times.

2. The diagnostic subsystem of claim 1, wherein:

said target system is a data storage device; and said controller additionally operates said selected ones of said switches to disconnect said line drivers and reconnect said initiator and said target systems.

3. A diagnostic subsystem for use with a Small Computer System Interface (SCSI), said interface having a plurality of lines connecting an initiator system and a target system, said diagnostic subsystem comprising:

a set of line drivers for providing a range of signals, said set of line drivers comprising a pair of line drivers for each line of, respectively, the initiator and target systems;

a set of switches for selectively connecting said initiator system and said target system to each other or to said line drivers, said set of switches comprising a pair of switches for, respectively, the initiator and target systems;

a set of sense lines connected to said initiator system and to said target system, said set of sense lines comprising a pair of sense lines connected to each line of, respectively, the initiator and target systems; and a controller for selectively operating selected ones of said switches to disconnect said initiator and said target systems and connect selected ones of said line drivers at selected lines of said Interface, operating said selected line drivers to selectively provide selected signals within said range to said Interface, said controller selectively operating said selected ones of said switches and operating said selected line drivers upon sensing a selected phase of operation of said Interface at said sense lines, said controller holding said selectively operated switches connected to said line drivers until sensing a selected phase of operation of said Interface at said sense lines, and said controller holding said selectively operated switches connected to said line drivers until sensing said selected phase of operation and upon generation of a request signal by one of said initiator or target systems at said Interface a selected number of times.

4. A diagnostic subsystem for use with a Small Computer System Interface (SCSI), said interface having a plurality of lines connecting an initiator system and a target system, said diagnostic subsystem comprising:

a set of line drivers for providing a range of signals, said set of line drivers comprising a pair of line drivers for each line of, respectively, the initiator and target systems;

a set of switches for selectively connecting said initiator system and said target system to each other or to said line drivers, said set of switches comprising a pair of switches for, respectively, the initiator and target systems;

a set of sense lines connected to said initiator system and to said target system, said set of sense lines comprising a pair of sense lines connected to each line of, respectively, the initiator and target systems; and a controller for selectively operating selected ones of said switches to disconnect said initiator and said target systems and connect selected ones of said line drivers at selected lines of said Interface, operating said selected line drivers to selectively provide selected signals within said range to said Interface, said controller selectively operating said selected ones of said switches and operating said selected line drivers upon sensing a selected phase of operation of said Interface at said sense lines, said controller holding said selectively operated switches connected to said line drivers until sensing a selected phase of operation of said Interface at said sense lines, and said controller holding said selectively operated switches connected to said line drivers until sensing said selected phase of operation and upon generation of an acknowledgement signal by one of said initiator or target systems at said Interface a selected number of times.

5. A Small Computer System Interface (SCSI) network having a plurality of lines, comprising:

an initiator system;

a target system; and a diagnostic subsystem having connections to said initiator system and said target system at said plurality of lines;

a set of line drivers for providing high or low SCSI signals, said set of line drivers comprising a pair of line drivers for each line of, respectively, the initiator and target systems;

a set of switches for selectively connecting said initiator system and said target system to each other or to said line drivers, said set of switches comprising a pair of switches for, respectively, the initiator and target systems;

a set of sense lines connected to said initiator system and to said target system, said set of sense lines comprising a pair of sense lines connected to each line of, respectively, the initiator and target systems; and a controller for selectively operating selected ones of said switches to disconnect said initiator and said target systems and connect selected ones of said line drivers at selected lines of said Interface, and to operate said selected line drivers to selectively provide said high or low SCSI signals to said Interface network, and said controller selectively operating said selected switches and said selected line drivers upon sensing said selected phase of operation and upon generation of a request signal by one of said initiator or target systems at said Interface a selected number of times.

6. The Small Computer System Interface of claim 5, wherein:

said target system is a data storage device; and said controller additionally operates said selected ones of said switches to disconnect said line drivers and reconnect said initiator and said target systems.

7. A Small Computer System Interface (SCSI) network having a plurality of lines, comprising:

an initiator system;

a target system; and a diagnostic subsystem having connections to said initiator system and said target system at said plurality of lines;

a set of line drivers for providing high or low SCSI signals, said set of line drivers comprising a pair of line drivers for each line of, respectively, the initiator and target systems;

a set of switches for selectively connecting said initiator system and said target system to each other or to said line drivers, said set of switches comprising a pair of switches for, respectively, the initiator and target systems;

a set of sense lines connected to said initiator system and to said target system, said set of sense lines comprising a pair of sense lines connected to each line of, respectively, the initiator and target systems; and a controller for selectively operating selected ones of said switches to disconnect said initiator and said target systems and connect selected ones of said line drivers at selected lines of said Interface, and to operate said selected line drivers to selectively provide said high or low SCSI signals to said Interface network, said controller holds said selectively operated switches connected to said line drivers until sensing a selected phase of operation of said Interface at said sense lines, and said controller holding said selectively operated switches connected to said line drivers until sensing said selected phase of operation and upon generation of a request signal by one of said initiator or target systems at said Interface a selected number of times.

8. A Small Computer System Interface (SCSI) network having a plurality of lines, comprising:

an initiator system;

a target system; and a diagnostic subsystem having connections to said initiator system and said target system at said plurality of lines;

a set of line drivers for providing high or low SCSI signals, said set of line drivers comprising a pair of line drivers for each line of, respectively, the initiator and target systems;

a set of switches for selectively connecting said initiator system and said target system to each other or to said line drivers, said set of switches comprising a pair of switches for, respectively, the initiator and target systems;

a set of sense lines connected to said initiator system and to said target system, said set of sense lines comprising a pair of sense lines connected to each line of, respectively, the initiator and target systems; and a controller for selectively operating selected ones of said switches to disconnect said initiator and said target systems and connect selected ones of said line drivers at selected lines of said Interface, and to operate said selected line drivers to selectively provide said high or low SCSI signals to said Interface network, said controller holds said selectively operated switches connected to said line drivers until sensing a selected phase of operation of said Interface at said sense lines, and said controller holding said selectively operated switches connected to said line drivers until sensing said selected phase of operation and upon generation of an acknowledgement signal by one of said initiator or target systems at said Interface a selected number of times.

9. A method of diagnosing a Small Computer System Interface (SCSI), said Interface having a plurality of lines connecting an initiator system and a target system, said systems communicating over said Interface by selectively providing high or low SCSI signals on said lines of said Interface, said diagnostic method comprising the steps of:

an initial step of sensing said signals of said initiator system and said target system at said Interface;

disconnecting said initiator system and said target system from each other at said lines, said disconnecting step conducted upon said sensing step sensing a selected pattern of signals at said Interface, said disconnecting step conducted upon sensing said selected pattern of signals and upon generation of a request signal by one of said initiator or target systems at said Interface a selected number of times;

selectively providing diagnostic high or low SCSI signals to said target system at said lines, and additionally selectively providing high or low SCSI signals to said initiator system at said lines; and sensing the response of said target system at said lines.

10. The diagnostic method of claim 9, wherein:

said target system is a data storage device; and additionally comprising the step of reconnecting said initiator and said target systems.

11. A method of diagnosing a Small Computer System Interface (SCSI), said Interface having a plurality of lines connecting an initiator system and a target system, said systems communicating over said Interface by selectively providing high or low SCSI signals on said lines of said Interface, said diagnostic method comprising the steps of:

an initial step of sensing said signals of said initiator system and said target system at said Interface;

disconnecting said initiator system and said target system from each other at said lines, said disconnecting step conducted upon said sensing step sensing a selected pattern of said signals at said Interface;

selectively providing diagnostic high or low SCSI signals to said target system at said lines, and additionally selectively providing high or low SCSI signals to said initiator system at said lines, and said selectively providing step is conducted until said response sensing step senses a selected pattern of signals at said Interface;

sensing the response of said target system at said lines; and said selectively providing step is conducted until said response sensing step senses said selected pattern of signals and upon generation of a request signal by one of said initiator or target systems at said Interface a selected number of times.

12. A method of diagnosing a Small Computer System Interface (SCSI), said Interface having a plurality of lines connecting an initiator system and a target system, said systems communicating over said Interface by selectively providing high or low SCSI signals on said lines of said Interface, said diagnostic method comprising the steps of:

an initial step of sensing said signals of said initiator system and said target system at said Interface;

disconnecting said initiator system and said target system from each other at said lines, said disconnecting step conducted upon said sensing step sensing a selected pattern of said signals at said Interface;

selectively providing diagnostic high or low SCSI signals to said target system at said lines, and additionally selectively providing high or low SCSI signals to said initiator system at said lines, and said selectively providing step is conducted until said response sensing step senses a selected pattern of signals at said Interface;

sensing the response of said target system at said lines; and said selectively providing step is conducted until said response sensing step senses said selected pattern of signals and upon generation of an acknowledgement signal by one of said initiator or target systems at said Interface a selected number of times.

* * * * *